United States Patent
Lin et al.

(10) Patent No.: US 11,251,925 B2
(45) Date of Patent: Feb. 15, 2022

(54) APPARATUS AND METHOD OF WIRELESS COMMUNICATION OF SAME

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/157,917

(22) Filed: Jan. 25, 2021

(65) Prior Publication Data

US 2021/0167926 A1    Jun. 3, 2021

Related U.S. Application Data

(63) Continuation of application No. PCT/CN2019/096489, filed on Jul. 18, 2019.

(60) Provisional application No. 62/720,766, filed on Aug. 21, 2018.

(51) Int. Cl.
*H04L 5/00*    (2006.01)
*H04W 76/14*   (2018.01)
*H04L 1/18*    (2006.01)

(52) U.S. Cl.
CPC .......... *H04L 5/0055* (2013.01); *H04L 1/1812* (2013.01); *H04L 1/1861* (2013.01); *H04L 5/0007* (2013.01); *H04W 76/14* (2018.02)

(58) Field of Classification Search
CPC .......... H04W 4/40; H04W 4/44; H04W 4/46; H04L 5/0055; H04L 1/1864
See application file for complete search history.

(56) References Cited

U.S. PATENT DOCUMENTS

| | | | |
|---|---|---|---|
| 2009/0055703 A1 | 2/2009 | Kim et al. | |
| 2017/0215183 A1 | 7/2017 | Gulati et al. | |
| 2019/0074941 A1* | 3/2019 | Hwang | H04B 1/7156 |
| 2019/0349895 A1 | 11/2019 | Liu et al. | |
| 2020/0305176 A1* | 9/2020 | Hu | H04B 7/0456 |
| 2021/0021387 A1* | 1/2021 | Chae | H04W 72/005 |

FOREIGN PATENT DOCUMENTS

| | | |
|---|---|---|
| CN | 108347313 A | 7/2018 |
| WO | 2018137452 A1 | 8/2018 |

OTHER PUBLICATIONS

3GPP TSG RAN WG1 #94—R1-1809446—Gothenburg, Sweden, Aug. 20-24, 2018—Qualcomm Incorporated, Support for unicast, groupcast and broadcast (4 pages).

(Continued)

*Primary Examiner* — Kevin Kim
(74) *Attorney, Agent, or Firm* — Perkins Coie LLP

(57) ABSTRACT

An apparatus and a method of wireless communication of the same are provided. The method includes receiving data from a second user equipment, performing decoding on the data from the second user equipment, and transmitting, to the second user equipment, feedback information according to a decoding state associated with the decoding on the data from the second user equipment, wherein the feedback information is carried in a sequence.

23 Claims, 5 Drawing Sheets

PSCCH/PSSCH    Feedback    GP

(56) References Cited

OTHER PUBLICATIONS

3GPP TSG RAN WG1 Meeting #94—R1-1808091—Gothenburg, Sweden, Aug. 20-24, 2018—Huawei, HiSilicon, Overview of sidelink unicast, groupcast and broadcast support for NR V2X (5 pages).
3GPP TSG RAN WG1 Meeting #94—R1-1809044—Gothenburg, Sweden, Aug. 20-24, 2018—Nokia, Nokia Shanghai Bell, Initial View on Support of unicast, groupcast and broadcast (5 pages).
3GPP TSG-RAN WG1 Meeting #94—R1-1809301—Göteborg, Sweden, Aug. 20-24, 2018—Ericsson, On the support of sidelink unicast, groupcast and broadcast (8 pages).
3GPP TSG-RAN WG1 Meeting #94—R1-1809302—Göteborg, Sweden, Aug. 20-24, 2018—Ericsson, Physical layer design of NR sidelink (11 pages).
International Search Report dated Oct. 11, 2019 of PCT/CN2019/096489 (2 pages).
EPO, Extended European Search Report for European Application No. 19853020.6. dated Jul. 27, 2021. 9 pages.

\* cited by examiner

APPARATUS AND METHOD OF WIRELESS COMMUNICATION OF SAME

CROSS-REFERENCE TO RELATED APPLICATION

This application is a continuation application of International Application No. PCT/CN2019/096489 filed on Jul. 18, 2019, which claims priority to U.S. application No. 62/720,766, filed on Aug. 21, 2018. The present application claims priority and the benefit of the above-identified applications and the above-identified applications are incorporated by reference herein in their entirety.

BACKGROUND OF DISCLOSURE

1. Field of Disclosure

The present disclosure relates to the field of communication systems, and more particularly, to an apparatus and a method of wireless communication of the same.

2. Description of Related Art

In new radio vehicle-to-everything (NR-V2X) technologies, unicast, groupcast, and broadcast are all supported and discussed. For the unicast, to improve reliability and resource efficiency, a feedback channel is needed. A first user equipment can feedback some information to a second user equipment to assist a re-transmission of the second user equipment. How to design the feedback channel needs to be considered in the NR-V2X technologies.

Therefore, there is a need to propose an apparatus and a method of wireless communication of the same capable of improving reliability and resource efficiency using a feedback channel.

SUMMARY

An object of the present disclosure is to propose an apparatus and a method of wireless communication of the same capable of improving reliability and resource efficiency using a feedback channel.

In a first aspect of the present disclosure, a first user equipment for wireless communication includes a memory, a transceiver, and a processor coupled to the memory and the transceiver. The processor is configured to control the transceiver to receive data from a second user equipment, perform decoding on the data from the second user equipment, and control the transceiver to transmit, to the second user equipment, feedback information according to a decoding state associated with the decoding on the data from the second user equipment.

In a second aspect of the present disclosure, a method of wireless communication of a first user equipment includes receiving data from a second user equipment, performing decoding on the data from the second user equipment, and transmitting, to the second user equipment, feedback information according to a decoding state associated with the decoding on the data from the second user equipment.

In a third aspect of the present disclosure, a second user equipment for wireless communication includes a memory, a transceiver, and a processor coupled to the memory and the transceiver. The processor is configured to control the transceiver to transmit data to a first user equipment and control the transceiver to receive feedback information according to a decoding state associated with the decoding on the data from the first user equipment.

In a fourth aspect of the present disclosure, a method of wireless communication of a second user equipment includes transmitting data to a first user equipment and receiving feedback information according to a decoding state associated with the decoding on the data from the first user equipment.

In a fifth aspect of the present disclosure, a non-transitory machine-readable storage medium has stored thereon instructions that, when executed by a computer, cause the computer to perform the above method.

In a sixth aspect of the present disclosure, a terminal device includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
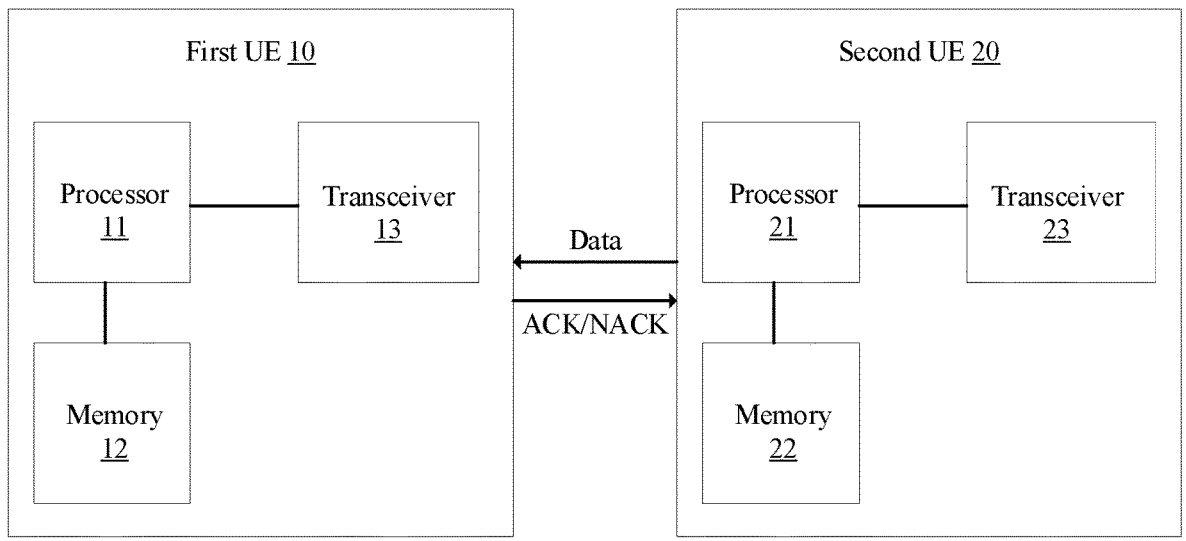
FIG. 1 is a block diagram of a first user equipment and a second user equipment for wireless communication according to an embodiment of the present disclosure.

FIG. 1 illustrates that, in some embodiments, a first user equipment (UE) 10 and a second user equipment 20 for wireless communication according to an embodiment of the present disclosure are provided. The data transmitter UE 20 may include a processor 21, a memory 22, and a transceiver 23. The data receiver UE 10 may include a processor 11, a memory 12, and a transceiver 13. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface. Embodiments of the present disclosure can be applied to any system which is based on sidelink communication, such as device-to-device (D2D).

In some embodiments, the processor 11 is configured to control the transceiver 13 to receive data from the second user equipment 20, perform decoding on the data from the second user equipment 20, and control the transceiver 13 to transmit, to the second user equipment 20, feedback information according to a decoding state associated with the decoding on the data from the second user equipment 20. In some embodiments, the feedback information is carried in a sequence. In some embodiments, the feedback information is transmitted in a feedback channel, such as a physical sidelink feedback channel (PSFCH).

In some embodiments, the feedback information is a hybrid automatic repeat request (HARQ) acknowledgement (ACK) or a HARQ negative acknowledgement (NACK). In some embodiments, the sequence is determined based on at least one of: the feedback information, an identity (ID) of the first user equipment 10, an ID of the second user equipment 20, and an ID of a group, wherein the group includes the first user equipment 10 and the second user equipment 20. In some embodiments, communication between the first user equipment 10 and the second user equipment 20 is via unicast or groupcast. The communication is unicast, that means the PSCCH and/or PSSCH is transmitted to a unique user equipment. The communication is groupcast, that means the PSCCH and/or PSSCH is transmitted to a group of user equipments. In some embodiments, the data is carried in the PSSCH. The PSCCH is used to schedule the PSSCH. In some embodiments, if the communication between the first user equipment 10 and the second user equipment 20 is via groupcast, the sequence is determined based on at least one of: the feedback information, an identity (ID) of the first user equipment 10, an ID of the second user equipment 20, and an ID of a group, wherein the group includes the first user equipment 10 and second user equipment 20. In some embodiments, an ID of the first or second user equipment is cell radio network temporary identifier (C-RNTI), or is the identity, which is used to identify a UE within the group. For example, there are 4 UEs within a group, the ID of each UE within the group is 0, 1, 2, 3 separately.

In some embodiments, the feedback information is transmitted on one orthogonal frequency division multiplexed (OFDM) symbol, and the one OFDM symbol is adjacent to the OFDM symbol which is used as a guard period (GP). In some embodiments, the one OFDM symbol is a second last OFDM symbol of a subframe and/or a slot, and the last OFDM symbol is used as the GP. In some embodiments, the one OFDM symbol is a third last OFDM symbol of a subframe and/or a slot, and the last and second last OFDM symbols are used as GP. In some embodiments, the one OFDM symbol is a last OFDM symbol of a subframe and/or a slot, and the last OFDM symbol can also be used as the GP. In some embodiments, the feedback information is repeatedly transmitted on two adjacent OFDM symbols, a second OFDM symbol of the two adjacent OFDM symbols including the feedback information is adjacent to the OFDM symbol which is used as GP. The two adjacent OFDM symbols are such as second last and third last OFDM symbols of a subframe and/or a slot. The two adjacent OFDM symbols carry repeated feedback information. Furthermore, a first OFDM symbol of the two adjacent OFDM symbols can be used as an automatic gain control (AGC) symbol.

In some embodiments, the data from the second user equipment is carried in a physical sidelink shared channel (PSSCH), and the feedback information corresponds to the PSSCH in the same subframe and/or the same slot or different subframes and/or different slots. In some embodiments, the feedback information is carried in a feedback channel, and a transmission resource of the feedback channel is determined by a transmission resource of a physical sidelink control channel (PSCCH) or a PSSCH, or indicated by the PSCCH. In some embodiments, a number of frequency resources of the feedback channel is same as a number of frequency resources of the PSSCH, or the number of the frequency resources of the feedback channel is same as frequency resources of a PSCCH, which is associated to the PSSCH, or the number of the frequency resources of the feedback channel is pre-configured or configured by a network. The frequency resource is in unit of physical resource block (PRB) or subchannel. In some embodiments, a frequency starting position of the feedback channel is same as a frequency starting position of the PSCCH or the PSSCH. In some embodiments, a frequency ending position of the feedback channel is same as a frequency ending position of the PSCCH or the PSSCH. In some embodiments, the feedback information is mapped to one resource element (RE) per N REs on an OFDM symbol, which is mapped with the feedback information. In some embodiments, a frequency length of the feedback channel is pre-configured or network configured. In some embodiments, the timing gap between the subframe or slot which includes the feedback channel and the subframe or slot which includes the PSCCH or the PSSCH is pre-configured or network configured. In some embodiments, the PSCCH indicates the time and/or frequency resource of the feedback channel.

In some embodiments, the processor 21 is configured to control the transceiver 23 to transmit data to the first user equipment 10 and control the transceiver 23 to receive feedback information according to a decoding state associated with the decoding on the data from the first user equipment 10. In some embodiments, the feedback information is carried in a sequence. In some embodiments, the feedback information is transmitted in a feedback channel, such as a physical sidelink feedback channel (PSFCH).

In some embodiments, the processor 21 is configured to detect the sequence and determine whether there is the feedback information transmitted to the second user equipment 20 itself and who has transmitted the feedback information according to the detection. In details, the detection is performed by cross-correlation between a local sequence and a received signal of the second user equipment.

In some embodiments, for feedback, the first user equipment 10 is a transmitter user equipment, and the second user equipment 20 is receiver user equipment. For PSCCH and/or PSSCH, the first user equipment 10 is a receiver user equipment, and the second user equipment 20 is a transmitter user equipment. In some embodiments, the data from second user equipment is carried in the PSSCH. The PSCCH is used to schedule the PSSCH. The feedback information corresponds to the decoding state associated with a decoding on the data, and carried in the feedback channel.

Figure 2:
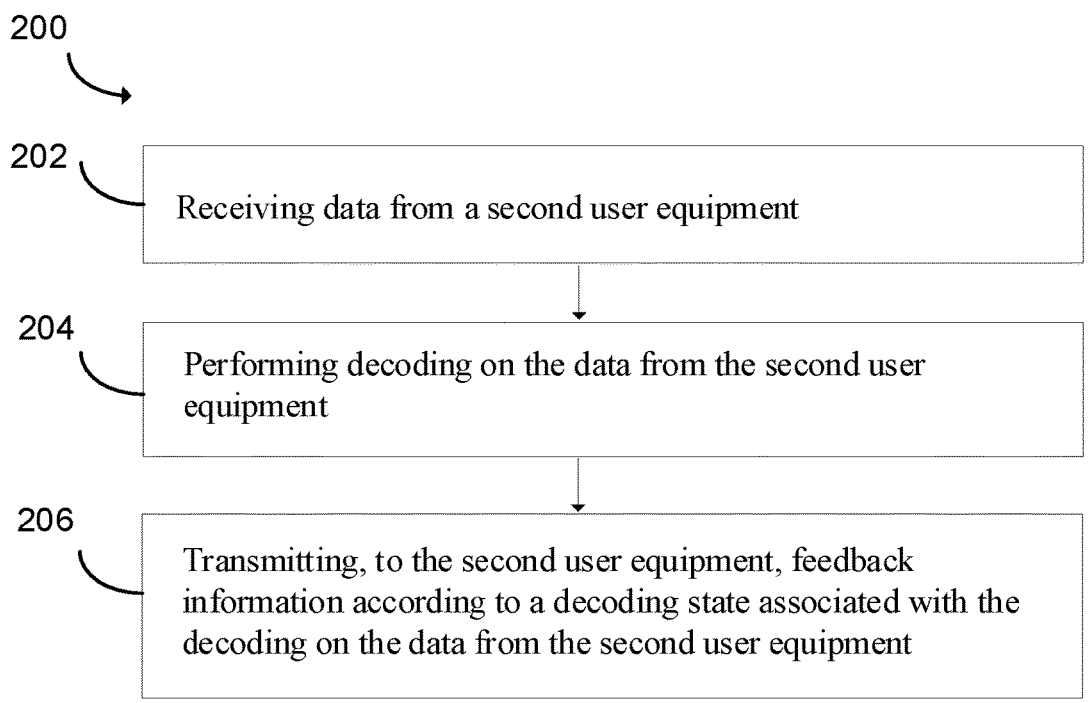
FIG. 2 is a flowchart illustrating a method of wireless communication of a first user equipment according to an embodiment of the present disclosure.

FIG. 2 illustrates a method 200 of wireless communication of a first user equipment according to an embodiment of the present disclosure. In some embodiments, the method 200 includes: a block 202, receiving data from a second user equipment, a block 204, performing decoding on the data from the second user equipment, and a block 206, transmitting, to the second user equipment, feedback information according to a decoding state associated with the decoding on the data from the second user equipment. In some embodiments, the feedback information is carried in a sequence. In some embodiments, the sequence is transmitted in a feedback channel, such as a physical sidelink feedback channel (PSFCH).

In some embodiments, the feedback information is a hybrid automatic repeat request (HARQ) acknowledgement (ACK) or a HARQ negative acknowledgement (NACK). In some embodiments, the sequence is determined based on at least one of: the feedback information, an identity (ID) of the first user equipment 10, an ID of the second user equipment 20, and an ID of a group, wherein the group includes the first user equipment 10 and the second user equipment 20. In some embodiments, communication between the first user equipment 10 and the second user equipment 20 is via unicast or groupcast. The communication is unicast, that means the PSCCH and/or PSSCH is transmitted to a unique user equipment. The communication is groupcast, that means the PSCCH and/or PSSCH is transmitted to a group of user equipments. In some embodiments, the data is carried in the PSSCH. The PSCCH is used to schedule the PSSCH. In some embodiments, if the communication between the first user equipment 10 and the second user equipment 20 is via groupcast, the sequence is determined based on at least one of: the feedback information, an identity (ID) of the first user equipment 10, an ID of the second user equipment 20, and an ID of a group, wherein the group includes the first user equipment 10 and second user equipment 20. In some embodiments, an ID of the first or second user equipment is cell radio network temporary identifier (C-RNTI), or is the identity, which is used to identify a UE within the group. For example, there are 4 UEs within a group, the ID of each UE within the group is 0, 1, 2, 3 separately. In some embodiments, the feedback information is transmitted on one orthogonal frequency division multiplexed (OFDM) symbol, and the one OFDM symbol is adjacent to an OFDM symbol which is used as a guard period. In some embodiments, the feedback information is repeatedly transmitted on two adjacent OFDM symbols, a second OFDM symbol of the two adjacent OFDM symbols including the feedback information is adjacent to an OFDM symbol which is used as a guard period. In some embodiments, the one OFDM symbol is a third last OFDM symbol of a subframe and/or a slot, and the last and second last OFDM symbols are used as GP. In some embodiments, the one OFDM symbol is a last OFDM symbol of a subframe and/or a slot, and the last OFDM symbol can also be used as the GP. The two adjacent OFDM symbols are such as second last and third last OFDM symbols of a subframe and/or a slot. The two adjacent OFDM symbols are repeated sequence. Furthermore, a first OFDM symbol of the two adjacent OFDM symbols can be used as an AGC symbol.

In some embodiments, the data from the second user equipment is carried in a physical sidelink shared channel (PSSCH), and the feedback information corresponds to the PSSCH in the same subframe and/or the same slot or different subframes and/or different slots. In some embodiments, the feedback information is carried in a feedback channel, and a transmission resource of the feedback channel is determined by a transmission resource of a physical sidelink control channel (PSCCH) or a PSSCH, or indicated by the PSCCH. In some embodiments, a number of frequency resources of the feedback channel is same as a number of frequency resources of the PSSCH, or the number of the frequency resources of the feedback channel is same as frequency resources of a PSCCH, which is associated to the PSSCH, or the number of the frequency resources of the feedback channel is pre-configured or configured by a network. The frequency resource is in unit of physical resource block (PRB) or subchannel.

In some embodiments, a frequency starting position of the feedback channel is same as a frequency starting position of the PSCCH or the PSSCH. In some embodiments, a frequency ending position of the feedback channel is same as a frequency ending position of the PSCCH or the PSSCH. In some embodiments, the feedback information is mapped to one resource element (RE) per N REs on an OFDM symbol, which is mapped with the feedback information. In some embodiments, a frequency length of the feedback channel is pre-configured or network configured. In some embodiments, the timing gap between the subframe or slot which includes the feedback channel and the subframe or slot which includes the PSCCH or the PSSCH is pre-configured or network configured. In some embodiments, the PSCCH indicates the time and/or frequency resource of the feedback channel.

Figure 3:
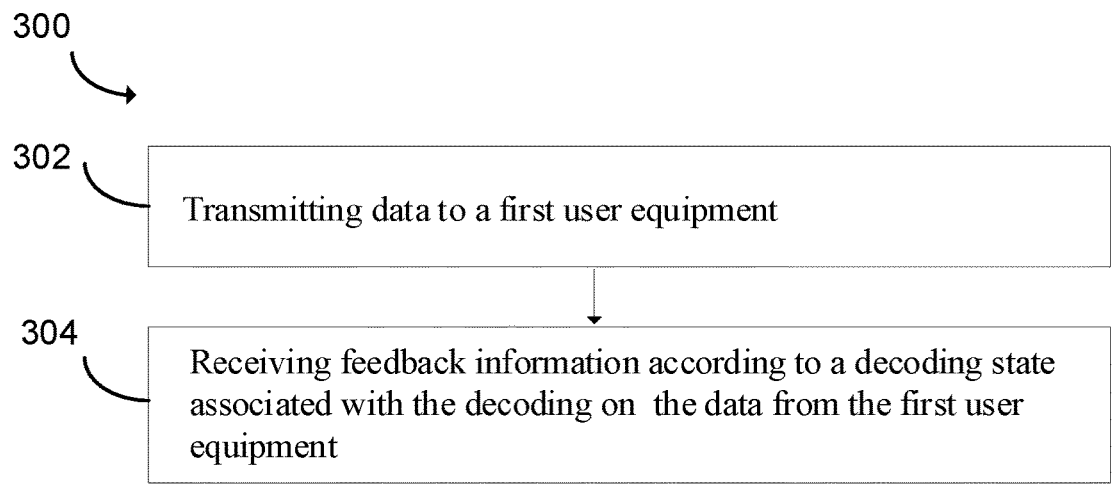
FIG. 3 is a flowchart illustrating a method of wireless communication of a second user equipment according to an embodiment of the present disclosure.

FIG. 3 illustrates a method 300 of wireless communication of a second user equipment according to an embodiment of the present disclosure. In some embodiments, the method 300 includes: a block 302, transmitting data to a first user equipment, and a block 304, receiving feedback information according to a decoding state associated with the decoding on the data from the first user equipment. In some embodiments, the feedback information is carried in a sequence. In some embodiments, the sequence is transmitted in a feedback channel, such as a physical sidelink feedback channel (PSFCH).

In some embodiments, the feedback information is a hybrid automatic repeat request (HARQ) acknowledgement (ACK) or a HARQ negative acknowledgement (NACK). In some embodiments, the sequence is determined based on at least one of: the feedback information, an identity (ID) of the first user equipment 10, an ID of the second user equipment 20, and an ID of a group, wherein the group includes the first user equipment 10 and the second user equipment 20. In some embodiments, communication between the first user equipment 10 and the second user equipment 20 is via unicast or groupcast. The communication is unicast, that means the PSCCH and/or PSSCH is transmitted to a unique user equipment. The communication is groupcast, that means the PSCCH and/or PSSCH is transmitted to a group of user equipments. In some embodiments, the data is carried in the PSSCH. The PSCCH is used to schedule the PSSCH. In some embodiments, if the communication between the first user equipment 10 and the second user equipment 20 is via groupcast, the sequence is determined based on at least one of: the feedback information, an identity (ID) of the first user equipment 10, an ID of the second user equipment 20, and an ID of a group, wherein the group includes the first user equipment 10 and second user equipment 20. In some embodiments, an ID of the first or second user equipment is cell radio network temporary identifier (C-RNTI), or is the identity, which is used to identify a UE within the group. For example, there are 4 UEs within a group, the ID of each UE within the group is 0, 1, 2, 3 separately. In some embodiments, the feedback information is transmitted on one orthogonal frequency division multiplexed (OFDM) symbol, and the one OFDM symbol is adjacent to an OFDM symbol which is used as a guard period. In some embodiments, the feedback information is repeatedly transmitted on two adjacent OFDM symbols, a second OFDM symbol of the two adjacent OFDM symbols including the feedback information is adjacent to an OFDM symbol which is used as a guard period. In some embodiments, the one OFDM symbol is a third last OFDM symbol of a subframe and/or a slot, and the last and second last OFDM symbols are used as GP. In some embodiments, the one OFDM symbol is a last OFDM symbol of a subframe and/or a slot, and the last OFDM symbol can also be used as the GP. The two adjacent OFDM symbols are such as second last and third last OFDM symbols of a subframe and/or a slot. The two adjacent OFDM symbols are repeated sequence. Furthermore, a first OFDM symbol of the two adjacent OFDM symbols can be used as an AGC symbol.

In some embodiments, wherein the data from the second user equipment is carried in a physical sidelink shared channel (PSSCH), and the feedback information corresponds to the PSSCH in the same subframe and/or the same slot or different subframes and/or different slots. In some embodiments, the feedback information is carried in a feedback channel, and a transmission resource of the feedback channel is determined by a transmission resource of a physical sidelink control channel (PSCCH) or a PSSCH, or indicated by the PSCCH. In some embodiments, a number of frequency resources of the feedback channel is same as a number of frequency resources of the PSSCH, or the number of the frequency resources of the feedback channel is same as frequency resources of a PSCCH, which is associated to the PSSCH, or the number of the frequency resources of the feedback channel is pre-configured or configured by a network. The frequency resource is in unit of physical resource block (PRB) or subchannel.

In some embodiments, a frequency starting position of the feedback channel is same as a frequency starting position of the PSCCH or the PSSCH. In some embodiments, a frequency ending position of the feedback channel is same as a frequency ending position of the PSCCH or the PSSCH. In some embodiments, the feedback information is mapped to one resource element (RE) per N REs on an OFDM symbol, which is mapped with the feedback information. In some embodiments, a frequency length of the feedback channel is pre-configured or network configured. In some embodiments, the timing gap between the subframe or slot which includes the feedback channel and the subframe or slot which includes the PSCCH or the PSSCH is pre-configured or network configured. In some embodiments, the PSCCH indicates the time and/or frequency resource of the feedback channel.

In some embodiments, the method 300 further includes detecting the sequence and determining that there is the feedback information transmitted to the second user equipment itself and who has transmitted the feedback information according to the detection. In some embodiments, the detection is performed by cross-correlation between a local sequence and a received signal of the second user equipment.

Figure 4:
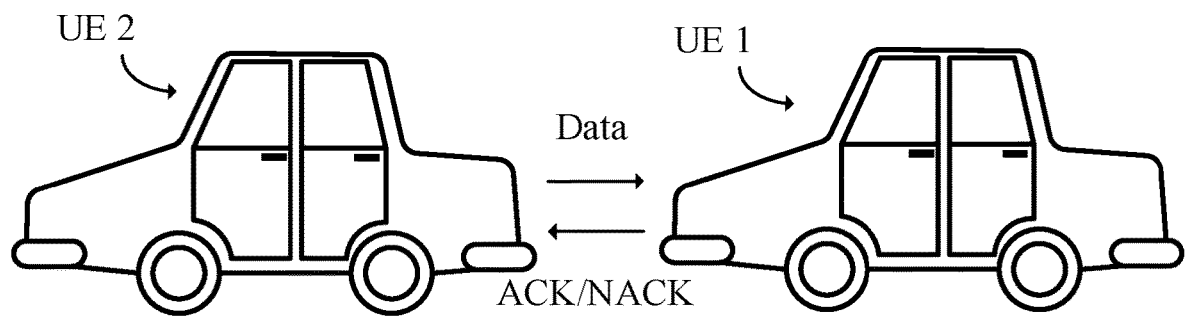
FIG. 4 is a schematic diagram of an exemplary illustration of a transmission and a feedback of a user equipment according to an embodiment of the present disclosure.

FIG. 4 is an exemplary illustration of a transmission and a feedback of a user equipment according to an embodiment of the present disclosure. FIG. 4 illustrates that, in some embodiments, two UEs 1 and 2 do unicast communication. The UE 2 transmits unicast data to the UE 1, and the UE 1 needs to feedback an ACK or a NACK to the UE 2 based on decoding states. The ACK (or the NACK) can be carried in a specific sequence. The following description is based on a feedback ACK from the UE 1 to the UE 2, it can also be applied to a feedback NACK from the UE 1 to UE 2. In some embodiments, the specific sequence is transmitted in a feedback channel, such as a physical sidelink feedback channel (PSFCH).

Figure 5:
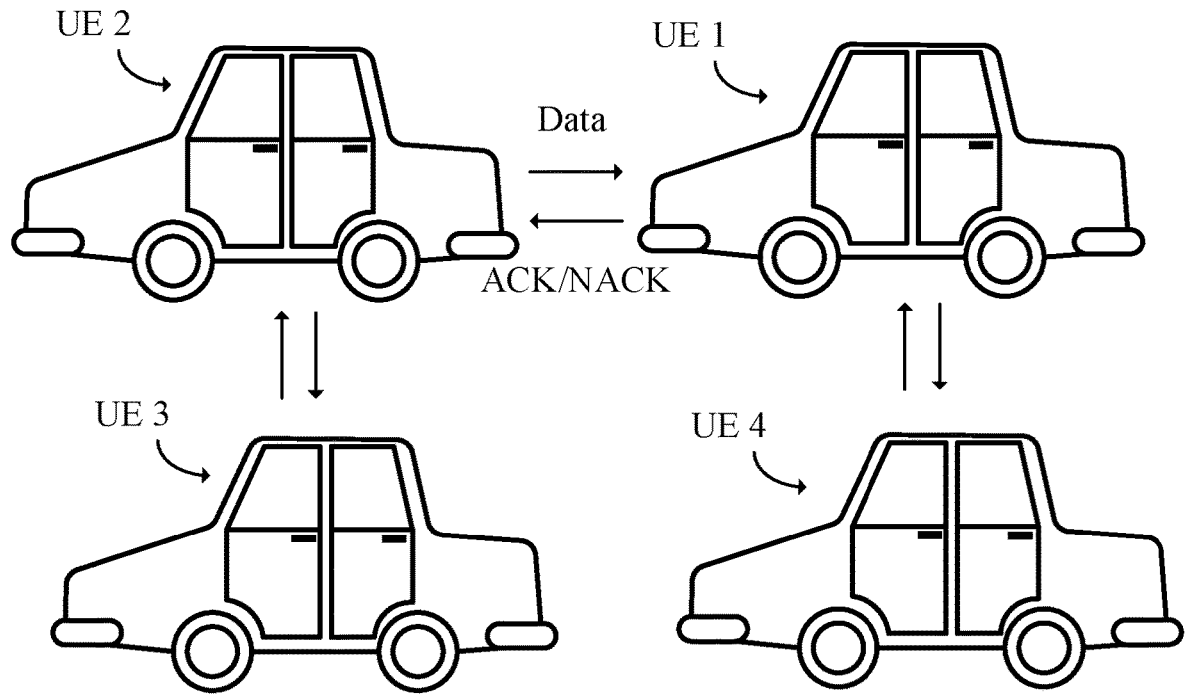
FIG. 5 is a schematic diagram of an exemplary illustration of a transmission and a feedback of a user equipment according to an embodiment of the present disclosure.

In some embodiments, either the UE 2 or the UE 1 may be involved in several unicast transmission at the same time. For example, FIG. 5 illustrates that, in some embodiments, a UE 2 does unicast communication with a UE 1 and a UE 3 separately, and the UE 1 does unicast communication with the UE 2 and a UE 4 separately. If the UE 1 wants to feedback an ACK or a NACK to the UE1, it needs to carry an ID of itself (i.e., the UE 1) and a target receiver (i.e., the UE 2) to differentiate feedback channels. Based on the IDs of the UE 2 and the UE 1, then the UE 2 can determine whether a feedback is for itself, and who sends feedback information.

The feedback information (for example the ACK) can be carried in a specific sequence. In some embodiments, the specific sequence is transmitted in a feedback channel, such as a physical sidelink feedback channel (PSFCH). The ID of the transmitter and/or the target receiver can also be carried in the specific sequence. That means, the specific sequence is generated or determined by the feedback information (for example the ACK), and/or the transmitter's ID (for example, a cell radio network temporary identity (C-RNTI) of the UE1, which is a transmitter of the feedback information), and/or the target receiver's ID (for example, a C-RNTI of the UE2, which is a target receiver of the feedback information). At a receiver side of a feedback channel (i.e., the UE2), it can detect whether there is feedback information (for example the ACK) transmitted by a corresponding transmitter (i.e., the UE 1). For example, the UE 2 sends data to the UE 1, and expects a feedback from the UE 1. Then the UE 2 can generate a corresponding sequence based on the feedback information (for example the ACK), and/or the transmitter's ID (for example, the C-RNTI of the UE 1), and/or the target receiver's ID (for example, the C-RNTI of the UE 2). The UE 2 can do cross-correlation between a local generated sequence and a received signal to determine whether there is feedback information (for example the ACK) transmitted from the UE 1 to the UE 2 itself. For example, the UE 2 can determine that there is an ACK transmitted by the UE 1 if a peak to an average ratio of a cross-correlation operation is above a threshold. The threshold can be pre-configured or configured by a network.

Whether an ACK or a NACK (or other information) can be denoted by a sequence can be pre-configured, pre-defined by a specification, or configured by a network. For example, the ACK is configured to be denoted by a sequence, and the NACK is configured to be denoted by another sequence. Another example, the sequence is generated based on a function or polynomial, and the feedback information and/or ID of transmitter UE and/or ID of receiver UE are input factors to the function or polynomial. If a UE wants to feedback the ACK, it can generate a sequence based on the ACK information, a transmitter's ID and a target receiver's ID. If the UE can detect such a sequence (for example by cross-correlation between a local sequence and a received signal), it can determine that there is an ACK transmitted to itself, and furthermore it can determine who has transmitted the ACK.

This scheme can be applied to both unicast and groupcast/multicast. For unicast, only one UE needs to feedback. While for groupcast, several UEs need to feedback. For each UE, it can generate a sequence based on the feedback information, and/or its own ID, and/or a target receiver's ID, and/or an ID of a group. At a receiver side of feedback information, the UE can detect feedback from multiple UEs based on different sequence separately. For each sequence detection, the previous method can be used.

Figure 6:
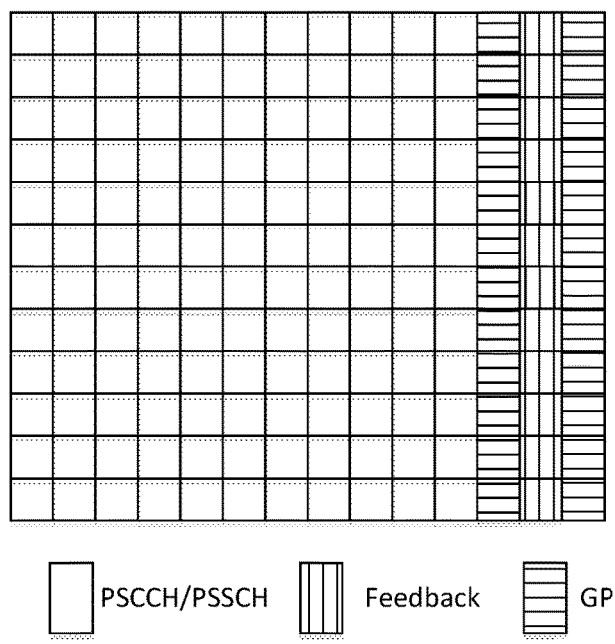
FIG. 6 is a schematic diagram of an exemplary illustration of a transmission resource for a feedback channel according to an embodiment of the present disclosure.

A feedback sequence can be only transmitted on one OFDM symbol. For example, the sequence is transmitted on a second last symbol of a symbol and/or slot. Furthermore, a last symbol can be used as a guard period (GP), as illustrated in FIG. 6.

In this subframe and/or this slot, a PSCCH and/or a PSSCH are transmitted at a beginning of the subframe and/or slot. Feedback is transmitted on the second last symbol. The symbol adjacent to a feedback symbol is used as the GP.

Figure 7:
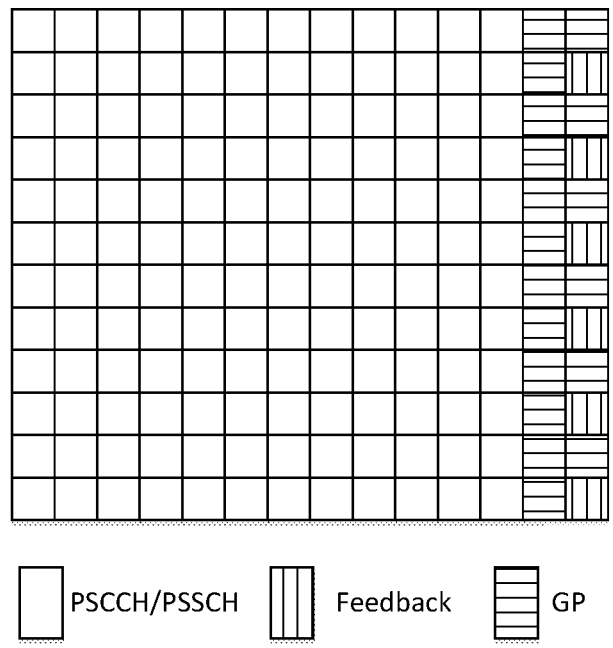
FIG. 7 is a schematic diagram of an exemplary illustration of a transmission resource for a feedback channel according to an embodiment of the present disclosure.
Figure 8:
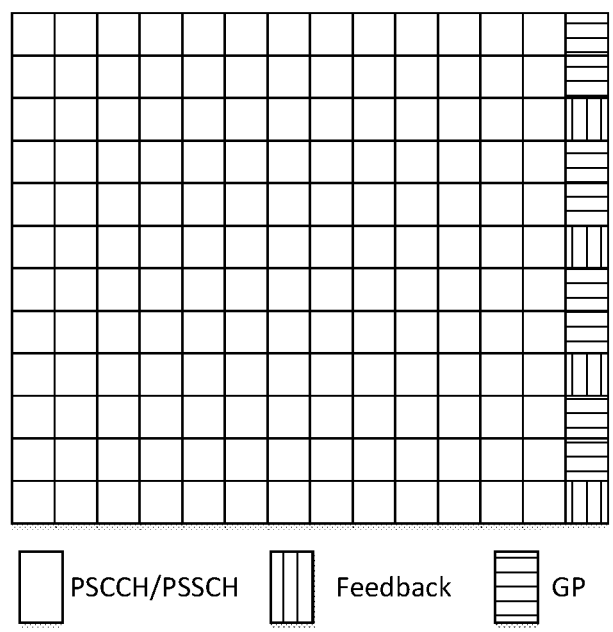
FIG. 8 is a schematic diagram of an exemplary illustration of a transmission resource for a feedback channel according to an embodiment of the present disclosure.

Alternatively, the feedback sequence can be transmitted on a last OFDM symbol of a subframe and/or a slot, as shown in FIGS. 7 and 8. The sequence only occupies 1 resource element per N resource elements, N=2 in FIG. 7, and N=3 in FIG. 8. Resource elements (REs) within a physical resource block (PRB) used for a feedback sequence can be pre-configured, pre-defined, or network configured.

If a sequence is transmitted every N resource elements, and the rest resource elements are empty, then a waveform of the sequence in time domain will repeat N times within one OFDM symbol duration. Only one of the waveforms in time domain can be transmitted, the others can be set to 0 and nothing will be transmitted and used as the GP. For example, in FIG. 8, if a signal on the last OFDM symbol is transformed to the time domain, the signal will be repeated 3 times. The first one and last one is not transmitted and used as the GP or us as a switching gap, only the second one can be transmitted. That can improve resource efficiency.

A feedback channel can correspond to a PSSCH in the same subframe. In this case, a frequency resource of the feedback channel can be associated with the PSSCH or a PSCCH. For example, a number of frequency resources of the feedback channel can be same as a number of frequency resources of the PSSCH. Or the number of the frequency resources of the feedback channel can be same as the number of frequency resources of the PSCCH, which is associated to the PSSCH. Or the number of the frequency resources of the feedback channel is pre-configured or configured by a network. A frequency starting position of the feedback channel is same as a frequency starting position of the PSCCH or the PSSCH, or a frequency ending position of the feedback channel is same as a frequency ending position of the PSCCH or the PSSCH. The frequency resource is in unit of physical resource block (PRB) or subchannel. In some embodiments, the feedback information is mapped to one resource element (RE) per N REs on an OFDM symbol, which is mapped with the feedback information. In some embodiments, the timing gap between the subframe or slot which includes the feedback channel and the subframe or slot which includes the PSCCH or the PSSCH is pre-configured or network configured. In some embodiments, the PSCCH indicates the time and/or frequency resource of the feedback channel.

Alternatively, the frequency starting position of feedback channel is same as the frequency starting position of the PSCCH or the PSSCH, or the frequency ending position of the feedback channel is same as a frequency ending position of the PSCCH or the PSSCH, and a frequency length of the feedback channel is pre-configured or network configured. In some embodiments, the feedback information is mapped to one resource element (RE) per N REs on an OFDM symbol, which is mapped with the feedback information. In some embodiments, the timing gap between the subframe or slot which includes the feedback channel and the subframe or slot which includes the PSCCH or the PSSCH is pre-configured or network configured. In some embodiments, the PSCCH indicates the time and/or frequency resource of the feedback channel.

The feedback channel in the subframe can also correspond to PSSCH in another subframe. Furthermore, in this case, the resource for feedback channel can be indicated by a data transmitter (i.e., the UE 2 in FIG. 4) or autonomously selected by a data receiver (i.e., the UE 1 in FIG. 4). If the resource of feedback channel is indicated by the transmitter, time and/or a frequency resource of the feedback channel can be indicated by the transmitter. For the time resource, the following information can be indicated, such as a starting position of feedback channel in the time domain, a subframe index or a slot index which is used for the feedback channel, or an offset between the subframe and/or the slot for the feedback channel and a PSSCH subframe. For the frequency resource, the following information can be indicated, such as the starting position of feedback channel, such as a lowest PRB index or a subchannel index, and a length of the frequency resource, such as a number of PRBs or subchannels used for the feedback channel.

For groupcast, multiple UEs who want to feedback can code division multiplexing (CDM) multiplexed in the same resource. A sequence of multiple UEs are different because of transmitter's ID are different.

If a feedback channel occupies 1/N REs within one OFDM symbol, such as FIGS. 7 and 8, the feedback channel of multiple UEs can be both frequency division multiplexing (FDM) and CDM in the OFDM symbol. For example, the UE 1 in FIG. 5 uses even REs of a PRB, and the UE 3 in FIG. 5 use odd REs of the same PRB.

Figure 9:
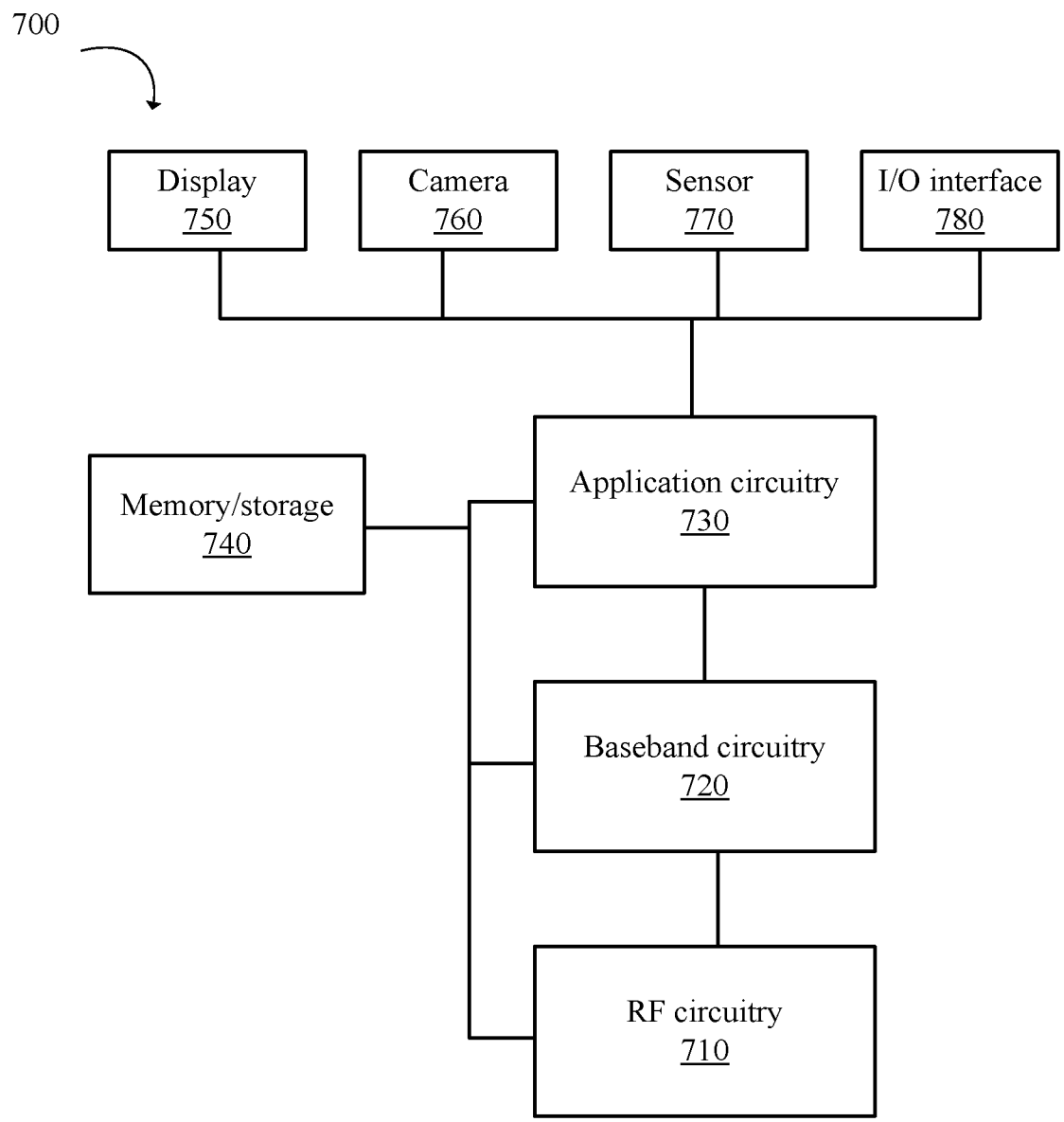
FIG. 9 is a block diagram of a system for wireless communication according to an embodiment of the present disclosure.

FIG. 9 is a block diagram of an example system 700 for wireless communication according to an embodiment of the present disclosure. Embodiments described herein may be implemented into the system using any suitably configured hardware and/or software. FIG. 9 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In summary, in some embodiments of the present disclosure, a feedback channel can be as follows.

1. A sequence of the feedback channel is used to carry an ACK or a NACK.

2. The sequence is determined based on at least one of: the feedback information, an identity (ID) of a first user equipment, an ID of a second user equipment, and an ID of a group, wherein the group includes the first user equipment and the second user equipment.

3. The feedback information is transmitted on one orthogonal frequency division multiplexed (OFDM) symbol, and the one OFDM symbol is adjacent to the OFDM symbol which is used as GP. In some embodiments, the feedback information is repeatedly transmitted on two adjacent OFDM symbols, a second OFDM symbol of the two adjacent OFDM symbols including the feedback information is adjacent to the OFDM symbol which is used as the GP. The two adjacent OFDM symbols are such as second last and third last OFDM symbols of a subframe and/or a slot. The two adjacent OFDM symbols carry repeated feedback information. Furthermore, a first OFDM symbol of the two adjacent OFDM symbols can be used as an AGC symbol.

4. The feedback channel can correspond to a PSSCH in the same slot or different slot.

5. A transmission resource of the feedback channel can be determined by a transmission resource of the PSCCH or a PSSCH, or indicated by the PSCCH.

6. It can be applied to both unicast and groupcast.

The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims

What is claimed is:

1. A first user equipment for wireless communication, comprising:
   a memory;
   a transceiver; and
   a processor coupled to the memory and the transceiver;
   wherein the processor is configured to:
      control the transceiver to receive data from a second user equipment;
      perform decoding on the data from the second user equipment; and
      control the transceiver to transmit, to the second user equipment, feedback information according to a decoding state associated with the decoding on the data from the second user equipment;
   wherein the feedback information is carried in a sequence, and the sequence is determined based on the feedback information and at least one of: an identity (ID) of the first user equipment, or an ID of the second user equipment;
   wherein the feedback information is repeatedly transmitted on two adjacent orthogonal frequency division multiplexed (OFDM) symbols, and wherein a second OFDM symbol of the two adjacent OFDM symbols comprises the feedback information adjacent to an OFDM symbol used as a guard period (GP).

2. The first user equipment of claim 1, wherein the feedback information is a hybrid automatic repeat request (HARQ) acknowledgement (ACK) or a HARQ negative acknowledgement (NACK).

3. The first user equipment of claim 1, wherein the sequence is further determined based on an ID of a group, wherein the group comprises the first user equipment and the second user equipment.

4. The first user equipment of claim 2, wherein communication between the first user equipment and the second user equipment is via unicast or groupcast.

5. The first user equipment of claim 1, wherein a symbol before an OFDM symbol on which the feedback information is transmitted is used as a GP, and a symbol after the OFDM symbol on which the feedback information is transmitted is used as a GP.

6. The first user equipment of claim 2, wherein a symbol before an OFDM symbol on which the feedback information is transmitted is used as a GP, and a symbol after the OFDM symbol on which the feedback information is transmitted is used as a GP.

7. The first user equipment of claim 1, wherein the data from the second user equipment is carried in a physical sidelink shared channel (PSSCH), and the feedback information corresponds to the PSSCH in the different slots.

8. The first user equipment of claim 1, wherein the feedback information is carried in a feedback channel, and a transmission resource of the feedback channel is determined by a transmission resource of a physical sidelink control channel (PSCCH) or a PSSCH, or indicated by the PSCCH.

9. The first user equipment of claim 8, wherein a number of frequency resources of the feedback channel is same as a number of frequency resources of the PSSCH or the number of the frequency resources of the feedback channel is same as frequency resources of a PSCCH, which is associated to the PSSCH, or the number of the frequency resources of the feedback channel is pre-configured or configured by a network.

10. The first user equipment of claim 8, wherein a frequency starting position of the feedback channel is same as a frequency starting position of the PSCCH or the PSSCH, or a frequency ending position of the feedback channel is same as a frequency ending position of the PSCCH or the PSSCH.

11. The first user equipment of claim 1, wherein the feedback information is mapped to one resource element (RE) per N REs on an OFDM symbol, which is mapped with the feedback information.

12. A method of wireless communication of a first user equipment, comprising:
 receiving data from a second user equipment;
 performing decoding on the data from the second user equipment; and
 transmitting, to the second user equipment, feedback information according to a decoding state associated with the decoding on the data from the second user equipment;
 wherein the feedback information is carried in a sequence, and the sequence is determined based on the feedback information and at least one of: an identity (ID) of the first user equipment, or an ID of the second user equipment;
 wherein the feedback information is repeatedly transmitted on two adjacent OFDM symbols, a second OFDM symbol of the two adjacent OFDM symbols comprising the feedback information adjacent to an OFDM symbol used as a GP.

13. The method of claim 12, wherein the feedback information is a hybrid automatic repeat request (HARQ) acknowledgement (ACK) or a HARQ negative acknowledgement (NACK).

14. The method of claim 12, wherein the sequence is further determined based on an ID of a group, wherein the group comprises the first user equipment and the second user equipment.

15. The method of claim 13, wherein communication between the first user equipment and the second user equipment is via unicast or groupcast.

16. The method of claim 12, wherein a symbol before an OFDM symbol on which the feedback information is transmitted is used as a GP, and a symbol after the OFDM symbol on which the feedback information is transmitted is used as a GP.

17. The method of claim 13, wherein a symbol before an OFDM symbol on which the feedback information is transmitted is used as a GP, and a symbol after the OFDM symbol on which the feedback information is transmitted is used as a GP.

18. The method of claim 12, wherein the data from the second user equipment is carried in a physical sidelink shared channel (PSSCH), and the feedback information corresponds to the PSSCH in different slots.

19. The method of claim 12, wherein the feedback information is carried in a feedback channel, and a transmission resource of the feedback channel is determined by a transmission resource of a physical sidelink control channel (PSCCH) or a PSSCH, or indicated by the PSCCH.

20. The method of claim 19, wherein a number of frequency resources of the feedback channel is same as a number of frequency resources of the PSSCH, or the number of the frequency resources of the feedback channel is same as frequency resources of a PSCCH, which is associated to the PSSCH, or the number of the frequency resources of the feedback channel is pre-configured or configured by a network.

21. The method of claim 19, wherein a frequency starting position of the feedback channel is same as a frequency starting position of the PSCCH or the PSSCH, or a frequency ending position of the feedback channel is same as a frequency ending position of the PSCCH or the PSSCH.

22. The method of claim 12, wherein the feedback information is mapped to one resource element (RE) per N REs on an OFDM symbol, which is mapped with the feedback information.

23. A non-transitory machine-readable storage medium having stored thereon instructions that, when executed by a computer, cause the computer to perform the method of claim 12.

* * * * *